Inventor
Vincent P. Farley

United States Patent Office 3,597,282
Patented Aug. 3, 1971

3,597,282
RECHARGEABLE SEALED SECONDARY
BATTERY OF THE BUTTON TYPE
Vincent P. Farley, Jr., Nixon, N.J., assignor to Gulton
Industries, Inc., Metuchen, N.J.
Filed July 9, 1969, Ser. No. 840,153
Int. Cl. H01m 1/06
U.S. Cl. 136—178                                     5 Claims

ABSTRACT OF THE DISCLOSURE

A rechargeable button type battery formed by two casing halves insulated one from the other with a battery plate assembly positioned between the casing halves. A gas vent is provided through one of the preferably outwardly flexible portions of one of the casing halves. A sealing member is positioned in the casing and overlying the gas vent to seal off the vent during normal operation of the battery. A spring carries said sealing member and applies mechanical pressure against the battery plate assembly forcing the same against the other casing half. When the battery is overcharged, gases generated within the battery casing exert force on the inner surface of the flexible casing half to expand the same away from the sealing member to vent the casing.

---

This invention relates generally to a rechargeable sealed secondary battery of the type wherein gases are generated within the battery casing, and more particularly to a battery that includes means for automatically venting this gas.

Button cell batteries generally have a thin circular casing comprising closely spaced insulated casing halves made of a conductive material to form respectively the positive and negative terminals of the battery. Button cell batteries normally have a plate assembly sandwiched between the casing half constituting the positive terminal of the battery and a compression spring contacting the opposite casing half constituting the negative terminal of the battery. The plate assembly normally comprises two or more pairs of negative and positive plates. Where more than two pairs of plates are used, the positive and negative plates are connected respectively together to form a parallel plate arrangement. The ampere-hour rating of the batteries is determined by the number of battery plates connected in parallel and the diameter and thickness of the plates, which are generally very thin circular discs having a thickness measured in thousandths of an inch. Where the active materials of the battery plates are nickel hydroxide and cadmium or cadmium hydroxide (batteries with such plates being commonly referred to as nickel-cadmium batteries), these button cell batteries have ano pen circuit voltage of 1.25 volts, and larger voltages are obtained by stacking a number of such batteries to build up the necessary voltage.

When a number of such sealed batteries are connected in series, all of the batteries do not become fully discharged at the same time and so when a fully discharged battery receives current from the other batteries generation of hydrogen gas generally results. Also, when such batteries are overcharged, oxygen gas is generated. At normal charge and discharge rates, the hydrogen and oxygen gases generated during the overcharge and overdischarge conditions described can be absorbed by the battery plates. However, when abnormally high charge and discharge rates occur because the batteries are overloaded on discharge or because improper charging equipment is used, such large amounts of gases are generated that they cannot be absorbed within the cell and a dangerous hazard of cell explosion occurs. Although many ways have been developed to consume or vent excess oxygen or hydrogen generated in wet cell batteries, these approaches have not usually been applied to dry cell batteries such as button cell batteries, where size and other problems seemed to have ruled out the practicality of these approaches.

One of the principal objects of my invention is to provide a rechargeable secondary dry cell battery, most preferably a dry cell battery of the button type, which has, heretofore, presented a safety problem in charging or discharging at abnormally high current levels, but which overcomes this problem by the incorporation therein of a unique and reliable vent.

Another object of my invention is to provide a dry cell battery as described above having means for venting excess gases generated therein during the overcharginng or overdischarging thereof in a manner which does not significantly increase the cost and/or size of the battery.

Briefly, my invention includes providing a small aperture or gas vent through one of the casing halves, and a sealing member underlying the vent to form a gas tight seal about the vent during normal operation or use of the battery. The sealing member is most advantageously secured to a partially compressed leaf spring sandwiched between the apertured casing half and the plate assembly to urge the battery plate assembly against the other casing half to anchor the same in the casing. The casing half which has the aperture formed therein is made of relatively thin metal and preferably provides a normally concave wall which can be flexed outwardly a small distance by the pressure of the gas generated within the battery casing. The aperture is most advantageously positioned at the innermost portion of the concave wall. The slight movement of this wall, caused by excessive gas pressure within the casing, flexes the wall initially to push the apertured portion of the wall away from the sealing member to vent the casing.

Figure 1:
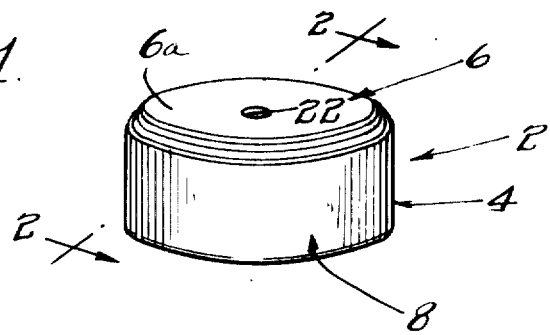
FIG. 1 is a perspective view of a button cell battery which is internally constructed in accordance with the present invention.
Figure 2:
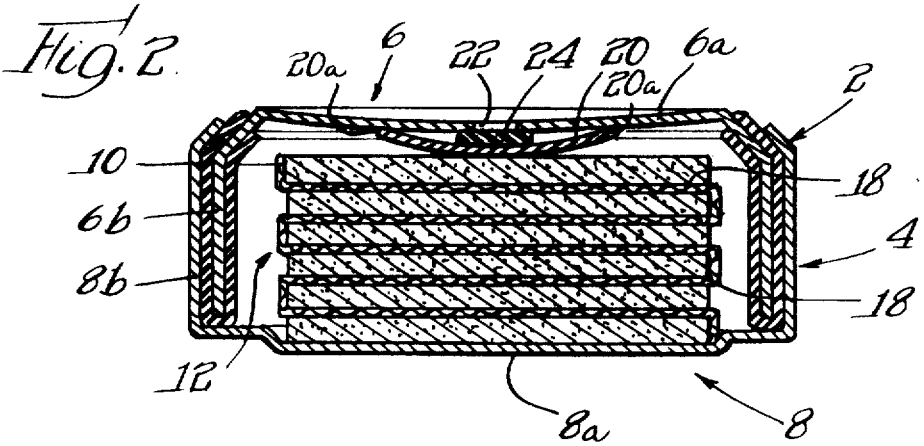
FIG. 2 is an enlarged sectional view of the battery of FIG. 1, taken along the section line 2—2 showing the parts of this invention in one condition.
Figure 3:
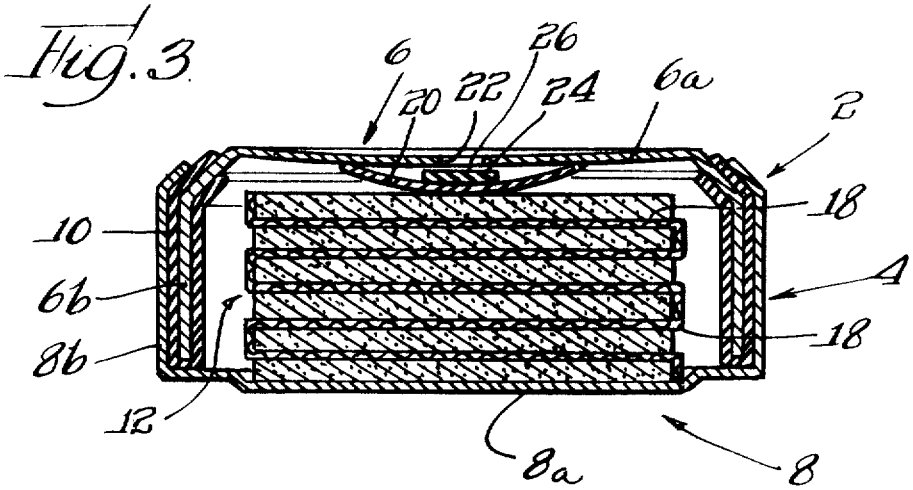
FIG. 3 is an enlarged sectional view of the battery of FIG. 2 taken along the line 2—2 thereof showing the parts of this invention in another condition.

Referring now more particularly to the form of the invention shown in FIGS. 1-3, the button cell battery thereshown and generally indicated by reference numeral 2 includes a relatively thin circular casing 4 comprising two complementary casing halves 6 and 8 which respectively form the positive and the negative terminals of the battery. The casing half 6 has a preferably normally slightly dished or concave outer wall 6a and an axially extending peripheral cylindrical side wall 6b. The casing half 8 has a generally flat outer wall 8a and an axially extending peripheral cylindrical side wall 8b surrounding and spaced from the side wall 6b of the casing half 6 by an insulating and sealing gasket 10. The casing half side wall 8b is crimped with the gasket around the casing half 6.

Sandwiched between the casing halves 6 and 8 is a battery plate assembly generally indicated by reference numeral 12. This plate assembly includes a plurality of alternately positioned positive battery plates 14 and negative battery plates 16, the term "positive battery plate" and "negative battery plate" meaning that the plates include respectively positive and negative active materials which are respectively oxidized and reduced during the charging of the battery and reduced and oxidized during the discharging thereof. In a nickel-cadmium battery, the active material of the positive plates in the discharged condition of the battery is divalent nickel hydroxide

[Ni(OH)₂] which is oxidized to trivalent nickel hydroxide [Ni(OH)₃] during charging of the battery, and the active material of the negative battery plates in the discharged condition thereby is cadmium hydroxide [Cd(OH)₂] which is reduced to metallic cadmium during charging of the battery.

The positive and negative battery plates 14 and 16 are separated by insulating layers 18 of electrolyte impregnated material. The electrolyte carried by the insulating layers 18 in a nickel-cadmium battery is an alkaline electrolyte, preferably a 30 to 34% aqueous solution of potassium hydroxide. The electrolyte impregnated layers 18 may be a fibrous material, such as nylon matted into a highly liquid absorbent body.

The extreme one of the negative plates 16 is in electrical contact with the inner surface of the casing wall 8a while the extreme one of the positive plates 14 is in electrical connection with the inner surface of the casing wall 6a through an electrically conductive leaf spring 20. The leaf spring securely mounts the battery plate assembly in the casing by applying a pressure thereagainst which forces it against the casing wall 8a.

It will be recalled that my invention deals with sealed rechargeable secondary batteries where gases are generated during the overcharging or overdischarging thereof which gases must be released or absorbed to avoid the build-up of excessive pressure within the battery. In accordance with this invention, an aperture 22 is formed in the intermost portion of the dished casing wall 6a and a resilient pad 24, preferably made of a material such as neoprene rubber and mounted on the leaf spring 20, is positioned in registry with the aperture 22 to form a gas-tight seal about the aperture during normal operation and use of the battery. The leaf spring 20 most advantageously is an arcuately bent piece of spring metal with the spring ends 20a—20a thereof engaging the concave wall 6a at opposite side of the aperture 22 with the center portion of the leaf spring engaging the uppermost plate assembly 12, as seen on the drawings. The resilient pad 24 is adhesively or otherwise secured to the portion of the concave side of the spring member directly opposite the aperture 22. Thus, the leaf spring 20 serves a dual purpose, namely that of applying an anchoring pressure to the battery plate assembly and that of holding the resilient pad 24 in registry with the aperture 22. Accordingly, a button cell constructed in accordance with this invention incorporates only one additional part with respect to the number of parts normally provided in the button cells of the prior art, namely, the resilient pad 24. This, together with the provision of the spring member 20, preferably designed and oriented in the manner described, and an apertured dished casing wall 6a, adds little cost to the button cell.

During charging or discharging of the battery 2, under conditions that creates gas within the casing 4, if the gas pressure builds up to an undesired level, the casing wall 6a will be pushed outwardly to cause the peripheral region of the aperture 22 to be displaced from the resilient pad 24, providing venting space 26 therebetween, as thus seen in FIG. 3. This displacement of the wall 6a causes the excess pressure within the battery casing 4 to be released, and immediately thereafter the wall 6a returns to its original position such that a gas-tight seal is once again formed about the periphery of the aperture 22. This sequence of venting excess gas pressure may be repeated many times during the recharging of the battery.

It should be understood that numerous modifications will be made in the most preferred form of the invention shown above without deviating from the broader aspects of the invention.

I claim:

1. In a rechargeable secondary dry cell battery of the button type including a normally sealed casing formed by first and second confronting casing parts insulated from each other and made of a conductive material forming spaced apart confronting positive and negative terminal walls of the battery, a plate assembly of active elements between said first and second casing parts, said plate assembly including at least one pair of flat parallel battery plates respectively having positive and negative active materials, and an electrolyte impregnated layer of material between said plates for supplying electrolyte to the plates, the plate of positive active material being in electrical connection with the casing part constituting the positive terminal wall of the battery and the plate of negative active material being in electrical connection with the casing part constituting the negative terminal wall of the battery, the improvement therein comprising: one of said terminal walls having an aperture formed therein, a sealing member placed within said casing in registry with said aperture, and biasing means carrying said sealing member and positioned within said casing between said one terminal wall and said plate assembly for normally holding said sealing member in sealing registry with said aperture under normal pressure in said casing and for applying mechanical pressure against said plate assembly to force the same against the other terminal wall, said one terminal wall and the aperture formed therein being displaced from said sealing member to vent the casing when excess gas pressure is generated within said casing.

2. A rechargeable secondary dry cell battery of the button type according to claim 1 wherein said biasing means is an arcuate leaf spring having the free ends thereof in contact with said one said terminal wall on opposite sides of said aperature and the center portion thereof in contact with the corresponding end plate of said plate assembly, and said sealing member is secured to said leaf spring near the center thereof so as to be in sealing contact with the periphery of said aperture when pressure in the casing is not excessive and is displaced from the periphery of said aperture when pressure in the casing becomes excessive.

3. A rechargeable secondary dry cell battery of the button type according to claim 1 wherein said one wall is flexible to expand outwardly to pull away from said sealing member to vent the casing when excessive gas pressure is generated within the casing.

4. A rechargeable secondary dry cell battery of the button type according to claim 1 wherein said one wall is concave and expands outwardly to a less concave condition to displace the periphery of said aperture from said sealing member to vent the casing when excessive gas pressure is generated within the casing.

5. In a rechargeable secondary dry cell battery of the button type including a normally sealed casing formed by first and second confronting casing parts insulated from each other and made of a conductive material forming spaced apart confronting positive and negative terminal walls of the battery, a plate assembly of active elements between said first and second casing parts, said plate assembly including at least one pair of flat parallel battery plates respectively having positive and negative active materials, and an electrolyte impregnated layer of material between said plates for supplying electrolyte to the plates, the plate of positive active materials being in electrical connection with the casing part constituting the positive terminal wall of the battery and the plate of negative active material being in electrical connection with the casing part constituting the negative terminal wall of the battery, the improvement therein comprising: one of said terminal walls being flexible and having an aperture formed therein, a sealing member placed within said casing in registry with said aperture, and biasing means carrying said sealing member and positioned within said casing between said one terminal wall and said plate assembly for normally holding said sealing member in sealing registry with said aperture under normal pressure in said casing and for applying mechanical pressure against said plate assembly to force the same against the other terminal wall, said biasing means being an arcuate leaf spring having the free ends thereof in contact with said one said terminal wall on opposite sides of said aperture and the center portion thereof in contact with the corresponding end plate of said plate assembly, and said sealing member being secured to said leaf spring near the center thereof so as to be in sealing contact with the periphery of said aperture when pressure in the casing is not excessive and is displaced from the periphery of said aperture when pressure in the casing becomes excessive, said flexible terminal wall being in a normal-retracted position and being pushed outwardly away from said sealing member to vent the casing when pressure in the casing becomes excessive.

References Cited

UNITED STATES PATENTS

| | | | |
|---|---|---|---|
| 1,515,652 | 11/1924 | French et al. | 136—133 |
| 1,808,702 | 6/1931 | Williams | 136—178 |
| 2,636,062 | 4/1953 | Colton | 136—133 |
| 3,293,081 | 12/1966 | Daley | 136—178 |

DONALD L. WALTON, Primary Examiner